(12) United States Patent
Liu et al.

(10) Patent No.: US 11,370,136 B2
(45) Date of Patent: Jun. 28, 2022

(54) DEVICE FOR MACHINING DISTINCTIVE MARKS ON LINE

(71) Applicant: CITIC Dicastal CO., LTD., Hebei (CN)

(72) Inventors: Weidong Liu, Qinhuangdao (CN); Shiwen Xu, Qinhuangdao (CN); Minglei Li, Qinhuangdao (CN)

(73) Assignee: CITIC DICASTAL CO., LTD., Hebei (CN)

( * ) Notice: Subject to any disclaimer, the term of this patent is extended or adjusted under 35 U.S.C. 154(b) by 229 days.

(21) Appl. No.: 16/713,478

(22) Filed: Dec. 13, 2019

(65) Prior Publication Data

US 2020/0406487 A1    Dec. 31, 2020

(30) Foreign Application Priority Data

Jun. 27, 2019  (CN) .......................... 201910565484.7

(51) Int. Cl.
*B26D 3/08*     (2006.01)
*B25B 1/06*     (2006.01)
*B25B 1/18*     (2006.01)
*B23Q 3/00*     (2006.01)

(52) U.S. Cl.
CPC .................. *B26D 3/08* (2013.01); *B23Q 3/00* (2013.01); *B25B 1/06* (2013.01); *B25B 1/18* (2013.01)

(58) Field of Classification Search
CPC ..................................... B25B 1/18; B26D 3/08
USPC ...................... 294/86.4; 83/660, 684, 698.91
See application file for complete search history.

(56) References Cited

U.S. PATENT DOCUMENTS

| 21,473 | A | * | 9/1858 | Storm | B44B 5/026 |
| | | | | | 101/4 |
| 926,271 | A | * | 6/1909 | Matthews | B44B 5/026 |
| | | | | | 101/3.1 |
| 1,430,226 | A | * | 9/1922 | Goodreau | B25B 1/18 |
| | | | | | 269/27 |
| 3,659,521 | A | * | 5/1972 | Lany | B44B 5/0033 |
| | | | | | 101/4 |
| 3,985,239 | A | * | 10/1976 | Bowers | B41F 17/18 |
| | | | | | 414/680 |
| 4,015,525 | A | * | 4/1977 | Shenoha | B41F 17/16 |
| | | | | | 101/333 |
| 4,099,436 | A | * | 7/1978 | Beneteau | B21D 28/002 |
| | | | | | 100/269.07 |
| 4,160,410 | A | * | 7/1979 | Fichter | B65B 61/26 |
| | | | | | 101/10 |
| 4,214,520 | A | * | 7/1980 | Eissel | B44B 5/0076 |
| | | | | | 101/4 |
| 4,363,175 | A | * | 12/1982 | Hedahl | G01B 11/275 |
| | | | | | 248/231.21 |
| 4,410,287 | A | * | 10/1983 | Speicher | B44B 5/0076 |
| | | | | | 101/4 |

(Continued)

FOREIGN PATENT DOCUMENTS

DE     102014210362 A1 *  12/2015 ............ B25J 19/063

*Primary Examiner* — Sean M Michalski
(74) *Attorney, Agent, or Firm* — Cooper Legal Group, LLC

(57) ABSTRACT

A device for machining distinctive marks on line includes a clamping positioning system and a mark machining system. The clamping positioning system includes a first frame, a clamping cylinder and a fixed roller are fixed on the first frame, and a clamping roller corresponding to the fixed roller is fixed to an output end of the clamping cylinder.

5 Claims, 1 Drawing Sheet

(56) References Cited

U.S. PATENT DOCUMENTS

| | | | | |
|---|---|---|---|---|
| 4,653,793 A * | 3/1987 | Guinot | B25J 13/082 | 294/106 |
| 4,736,927 A * | 4/1988 | Clancy | B25B 1/18 | 254/93 H |
| 4,872,699 A * | 10/1989 | Grove | B62D 17/00 | 280/86.753 |
| 4,932,128 A * | 6/1990 | Dacey, Jr. | B21D 28/002 | 30/358 |
| 5,095,618 A * | 3/1992 | Dacey, Jr. | B26F 1/34 | 30/277.4 |
| 5,242,202 A * | 9/1993 | Ettinger | G01B 5/255 | 294/119.1 |
| 5,263,696 A * | 11/1993 | Frye | D05B 35/062 | 269/227 |
| 5,316,277 A * | 5/1994 | Banks | B25B 1/12 | 269/17 |
| 5,382,102 A * | 1/1995 | Brolund | B21D 28/12 | 101/3.1 |
| 5,503,508 A * | 4/1996 | Amiguet | B23B 31/4006 | 408/1 R |
| 5,851,041 A * | 12/1998 | Anderson | B25B 5/08 | 294/106 |
| 6,065,513 A * | 5/2000 | Paakkunainen | A01G 23/083 | 144/24.13 |
| 6,460,786 B1 * | 10/2002 | Roberts | G09F 3/02 | 239/542 |
| 6,598,917 B1 * | 7/2003 | Hapner | B25J 15/0028 | 157/1.36 |
| 2001/0000501 A1 * | 4/2001 | Shinoda | H01J 9/00 | 445/45 |
| 2001/0021728 A1 * | 9/2001 | Gorlich | A61C 13/20 | 523/115 |
| 2005/0071980 A1 * | 4/2005 | Rasmussen | B21D 17/02 | 29/462 |
| 2006/0259363 A1 * | 11/2006 | Jhetam | G06Q 30/0215 | 705/14.17 |
| 2008/0203641 A1 * | 8/2008 | Reed | H01J 40/14 | 269/282 |
| 2014/0077434 A1 * | 3/2014 | Chang | B64F 5/50 | 269/287 |
| 2015/0298824 A1 * | 10/2015 | Larson | B64F 5/10 | 29/559 |
| 2015/0352677 A1 * | 12/2015 | Guillot | B23Q 1/76 | 29/557 |
| 2016/0136789 A1 * | 5/2016 | Fukui | B25B 5/003 | 269/32 |
| 2016/0271791 A1 * | 9/2016 | Schultz | B23K 9/16 | |
| 2017/0258125 A1 * | 9/2017 | Thomas | B29C 48/30 | |
| 2018/0243810 A1 * | 8/2018 | Costa | G03B 11/04 | |
| 2018/0369890 A1 * | 12/2018 | Turla | B21C 35/04 | |
| 2020/0108487 A1 * | 4/2020 | Chartier | B25B 5/147 | |
| 2020/0353693 A1 * | 11/2020 | Cao | B29C 65/20 | |

* cited by examiner

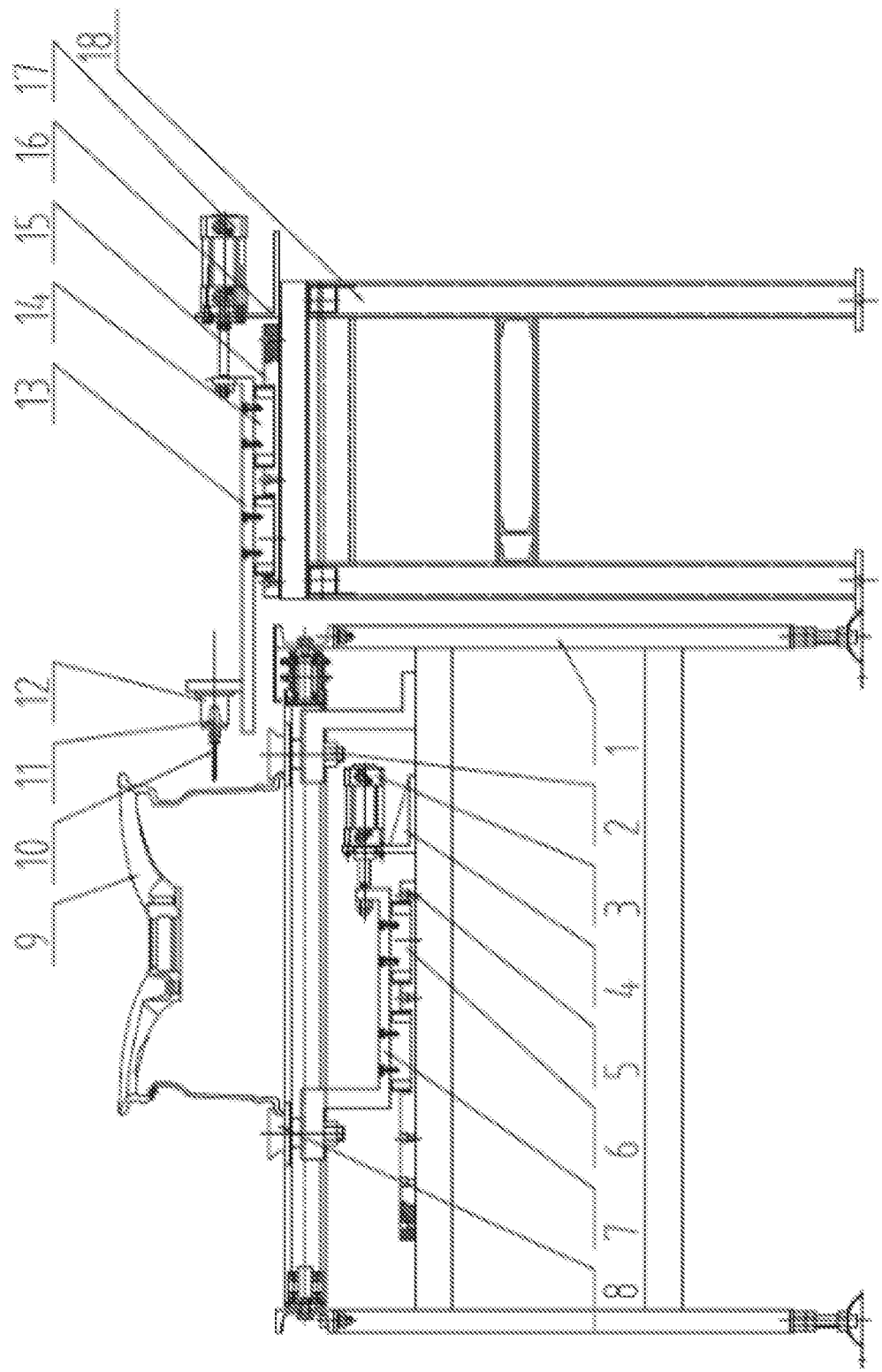

DEVICE FOR MACHINING DISTINCTIVE MARKS ON LINE

CROSS-REFERENCE TO RELATED APPLICATION

The present application claims benefit of Chinese Patent Application No. 201910565484.7, filed on Jun. 27, 2019, the contents of which are hereby incorporated by reference in their entirety.

BACKGROUND

In an automatic machining environment of wheels, the problem of rejects mixed in products is very prominent. How to distinguish and pick out the rejects is a difficult problem for wheel machining enterprises. The present disclosure introduces a universal device for machining distinctive marks on line, which can machine distinctive marks on wheel rims of different sizes and different structures, and identify and pick up rejects in combination with an air-leakage detection device.

SUMMARY

The present disclosure relates to the field of machining technology, and specifically to a device for machining distinctive marks on line.

In view of this, the present disclosure is directed to provide a device for machining distinctive marks on line, which has strong versatility and can meet on-line identification of wheels of different sizes and different structures.

In order to achieve the above objective, the present disclosure provides the following technical solution.

A device for machining distinctive marks on line, including a clamping positioning system and a mark machining system, in which the clamping positioning system includes a first frame, a clamping cylinder and a fixed roller being fixed on the first frame, and a clamping roller corresponding to the fixed roller being fixed to an output end of the clamping cylinder; and the mark machining system includes a second frame, a power cylinder being further disposed on the second frame, and a punch being fixed to an output end of the power cylinder.

In an embodiment, a first linear guiding rail is further fixed on the first frame, a first guiding rail sliding seat is disposed on the first linear guiding rail, a sliding seat is fixed on the first guiding rail sliding seat, one end of the sliding seat is fixedly connected to the clamping cylinder, and the other end of the sliding seat is fixedly connected to the clamping roller.

In an embodiment, the clamping cylinder and the sliding seat are disposed below the fixed roller, the sliding seat is a structure in the shape of a symbol "Ƨ", one end at an upper part of the sliding seat in the shape of the symbol "Ƨ" is fixedly connected to the clamping roller, and the other end at a lower part of the sliding seat in the shape of the symbol "Ƨ" is fixedly connected to the clamping cylinder.

In an embodiment, clamping cylinder block is mounted on the first frame, and the clamping cylinder is fixed to the clamping cylinder block.

In an embodiment, a second linear guiding rail is fixed on the second frame, a second guiding rail sliding seat is disposed on the second linear guiding rail, a connecting plate is fixed on the second guiding rail sliding seat, one end of the connecting plate is fixedly connected to the power cylinder and the other end of the connecting plate is fixedly connected to the punch.

In an embodiment, a mounting seat is fixed on the connecting plate, and the punch is mounted on the mounting seat.

In an embodiment, a cylinder block is further mounted on the second frame, and the power cylinder is fixedly mounted on the cylinder block.

Compared with the prior art, the device for machining distinctive marks on line according to the present disclosure has the following advantages:

The device for machining distinctive marks on line according to the present disclosure can meet the requirements of machining distinctive marks on wheels on line, and has the characteristics of simple structure, convenient manufacture, stable performance, and space saving.

BRIEF DESCRIPTION OF DRAWINGS

The accompanying drawing constituting a part of the present disclosure is used for providing a further understanding of the present disclosure, and the schematic embodiments of the present disclosure and the descriptions thereof are used for interpreting the present disclosure, rather than constituting improper limitations to the present disclosure. In the drawing:

FIG. 1 is a schematic structural diagram of a device for machining distinctive marks on line according to the present disclosure;

LIST OF REFERENCE SYMBOLS

1—first frame, 2—fixed roller, 3—clamping cylinder, 4—clamping cylinder block, 5—first linear guiding rail, 6—first guiding rail sliding seat, 7—sliding seat, 8—clamping roller, 9—wheel, 10—punch, 11—punch holder, 12—mounting seat, 13—connecting plate, 14—second guiding rail sliding seat, 15—second linear guiding rail, 16—cylinder block, 17—power cylinder, 18—second frame

DETAILED DESCRIPTION

It should be noted that the embodiments in the present disclosure and the features in the embodiments can be combined with each other without conflicts.

The following clearly and completely describes the technical solutions of the present disclosure with reference to the accompanying drawing and in combination with the embodiments. Apparently, the described embodiments are part of, not all of, the embodiments of the present disclosure. All other embodiments obtained by a person skilled in the art based on the embodiments of the present disclosure without creative efforts shall fall within the protection scope of the present disclosure.

A device for machining distinctive marks on line according to an embodiment of the present disclosure will be described below with reference to FIG. 1 and in combination with the embodiments.

A device for machining distinctive marks on line includes a clamping positioning system and a mark machining system, in which the clamping positioning system includes a first frame 1, a clamping cylinder 3 and a fixed roller 2 are fixed on the first frame 1, a clamping roller 8 corresponding to the fixed roller 2 is fixed to an output end of the clamping cylinder 3, a wheel 9 is placed on the first frame 1, the clamping cylinder 3 can drive the clamping roller 8 and the wheel 9 to move horizontally along a straight line, and the wheel 9 is finally clamped and positioned by the clamping roller 8 and the fixed roller 2 together.

The mark machining system includes a second frame 18, a power cylinder 17 is further disposed on the second frame 18, a punch 10 is fixed to an output end of the power cylinder 17, the power cylinder 17 can drive the punch 10 to move at a high speed, and the punch 10 hits against a rim of the wheel 9 and leaves a hole mark on the rim.

In an embodiment, the clamping cylinder 3 and a sliding seat 7 are disposed below the fixed roller 2, the sliding seat 7 is a structure in the shape of a symbol "Z", one end at an upper part of the sliding seat 7 in the shape of the symbol "Z" is fixedly connected to the clamping roller 8, and the other end at a lower part of the sliding seat 7 in the shape of the symbol "Z" is fixedly connected to the clamping cylinder 3.

In an embodiment, a clamping cylinder block 4 is mounted on the first frame 1, and the clamping cylinder 3 is fixed to the clamping cylinder block 4.

In an embodiment, a second linear guiding rail 15 is fixed on the second frame 18, a second guiding rail sliding seat 14 is disposed on the second linear guiding rail 15, a connecting plate 13 is fixed on the second guiding rail sliding seat 14, one end of the connecting plate 13 is fixedly connected to the power cylinder 17 and the other end of the connecting plate is fixedly connected to the punch 10, the power cylinder 17 can drive the punch 10 to move at a high speed along the second linear guiding rail 15, and the punch 10 hits against the rim of the wheel 9 and leaves a hole mark on the rim.

In an embodiment, a mounting seat 12 is fixed on the connecting plate 13, and the punch 10 is mounted on the mounting seat 12.

In an embodiment, a cylinder block 16 is further mounted on the second frame 18, and the power cylinder 17 is fixedly mounted on the cylinder block 16.

In an embodiment, the wheel 9 on which a distinctive mark is need to be machined is transported to a designated position of the device by a roller path logistics system, and then the clamping cylinder 3 drives the clamping roller 8 to move horizontally along a first linear guiding rail 5. In this process, the clamping roller 8 is gradually in contact with the wheel 9, and drives the wheel 9 to move synchronously along the first linear guiding rail 5 toward the fixed roller 2, and the clamping roller 8 and the fixed roller 2 clamp the wheel 9 together. Then, the power cylinder 17 can drive the punch 10 to move at a high speed along the second linear guiding rail 15, and the punch 10 hits against the rim of the wheel 9 and leaves a hole mark on the rim. So far, the operation of machining a distinctive mark on a wheel on line is completed, and the roller path logistics system transports the wheel away.

Compared with the prior art, the device for machining distinctive marks on line according to the present disclosure has the following advantages:

The device for machining distinctive marks on line according to the present disclosure can meet the requirements of machining distinctive marks on wheels on line, and has the characteristics of simple structure, convenient manufacture, stable performance, and space saving.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

The invention claimed is:

1. An apparatus for machining a hole mark on a rim of a wheel on a production line, comprising a clamping positioning system and a hole mark machining system, wherein the clamping positioning system comprises a first frame, a clamping cylinder and a fixed roller being fixed on the first frame, and a clamping roller corresponding to the fixed roller and being fixed to an end of the clamping cylinder, a first linear guiding rail is further fixed on the first frame, a first guiding rail sliding seat is disposed on the first linear guiding rail, a sliding member is fixed on the first guiding rail sliding seat, the clamping cylinder and the sliding member are disposed below the fixed roller, the sliding member comprises a first horizontal portion, a second vertical portion, a third horizontal portion, and a fourth vertical portion connected in sequence, the first horizontal portion is parallel to the third horizontal portion and perpendicular to the second vertical portion and the fourth vertical portion, the first horizontal portion is fixedly connected to the clamping roller, and the fourth vertical portion is fixedly connected to the clamping cylinder, when the wheel is placed on the first frame, the clamping cylinder is configured to drive the clamping roller and the wheel to move horizontally along a straight line, and the wheel is finally clamped and positioned by the clamping roller and the fixed roller together; and the hole mark machining system comprises a second frame, a power cylinder being further disposed on the second frame, and a punch being fixed to an end of the power cylinder, wherein the power cylinder is configured to drive the punch to horizontally move along a second linear guiding rail of the second frame, and the punch hits against the rim of the wheel and leaves a hole mark on the rim.

2. The apparatus for machining a hole mark on a rim of a wheel on a production line according to claim 1, wherein a clamping cylinder block is mounted on the first frame, and the clamping cylinder is fixed to the clamping cylinder block.

3. The apparatus for machining a hole mark on a rim of a wheel on a production line according to claim 1, wherein the second linear guiding rail is fixed on the second frame, a second guiding rail sliding seat is disposed on the second linear guiding rail, a connecting plate is fixed on the second guiding rail sliding seat, one end of the connecting plate is fixedly connected to the power cylinder and the another end of the connecting plate is fixedly connected to the punch.

4. The apparatus for machining a hole mark on a rim of a wheel on a production line according to claim 3, wherein a mounting seat is fixed on the connecting plate, and the punch is mounted on the mounting seat.

5. The apparatus for machining a hole mark on a rim of a wheel on a production line according to claim 4, wherein a cylinder block is further mounted on the second frame, and the power cylinder is fixedly mounted on the cylinder block.

* * * * *